US011057158B2

(12) United States Patent
Teboulle et al.

(10) Patent No.: US 11,057,158 B2
(45) Date of Patent: Jul. 6, 2021

(54) DELEGATION OF MANAGEMENT OF ACKNOWLEDGEMENTS AND OF TRANSMISSION OF FRAMES

(71) Applicant: SAGEMCOM ENERGY & TELECOM SAS, Rueil Malmaison (FR)

(72) Inventors: Henri Teboulle, Rueil Malmaison (FR); Marc Le Gourrierec, Rueil Malmaison (FR); Franck Harnay, Rueil Malmaison (FR)

(73) Assignee: SAGEMCOM ENERGY & TELECOM SAS, Rueil Malmaison (FR)

( * ) Notice: Subject to any disclaimer, the term of this patent is extended or adjusted under 35 U.S.C. 154(b) by 0 days.

(21) Appl. No.: 16/453,361

(22) Filed: Jun. 26, 2019

(65) Prior Publication Data
US 2020/0007277 A1 Jan. 2, 2020

(30) Foreign Application Priority Data
Jun. 28, 2018 (FR) ...................................... 18/55823

(51) Int. Cl.
*H04W 12/06* (2021.01)
*H04L 1/16* (2006.01)
(Continued)

(52) U.S. Cl.
CPC .......... *H04L 1/1685* (2013.01); *H04L 1/1874* (2013.01); *H04L 5/0098* (2013.01); *H04W 72/0446* (2013.01); *H04W 88/16* (2013.01)

(58) Field of Classification Search
CPC ... H04L 1/1685; H04L 1/1874; H04L 5/0098; H04W 52/0203; H04W 52/0229;
(Continued)

(56) References Cited

U.S. PATENT DOCUMENTS 7,640,321 B2 * 12/2009 Yabe ...................... H04L 67/02
709/212
7,826,469 B1 * 11/2010 Li ....................... H04L 47/6215
370/412

(Continued)

OTHER PUBLICATIONS

Lorra Alliance et al; "LoRaWAN™,—What Is it? A technical overview of LoRa® and LoRAWAN™; Technical Marketing Workgroup 1.0;" LoRA Alliance; Nov. 2015.
(Continued)

*Primary Examiner* — Phuc H Tran
(74) *Attorney, Agent, or Firm* — Oliff PLC; R. Brian Drozd

(57) ABSTRACT

A communication system includes a server with at least one end device and one gathering gateway that transmit to the server uplink frames having moments of transmission according to which are defined reception windows intended for downlink frames supposed to be constructed by the server and relayed by one said gathering gateway selected by the server. A disengageable delegation mechanism vis-à-vis at least one elected end device is implemented in collaboration with the server by an elected gathering gateway by: allocating a buffer to each elected end device and storing therein useful data received asynchronously from the server for the attention of said elected end device; and by constructing and transmitting, on behalf of the server, downlink frames in response to the uplink frames received from each elected end device.

9 Claims, 5 Drawing Sheets

(51) Int. Cl.
　　　*H04L 1/18*　　　(2006.01)
　　　*H04L 5/00*　　　(2006.01)
　　　*H04W 72/04*　　(2009.01)
　　　*H04W 88/16*　　(2009.01)

(58) Field of Classification Search
　　　CPC ......... H04W 52/0254; H04W 72/0446; H04W 88/16; H04W 4/80; H04W 52/0216; H04W 52/0235; H04W 84/042; Y02D 70/00; Y02D 70/1224; Y02D 70/1262; Y02D 70/142; Y02D 70/146; Y02D 70/26
　　　See application file for complete search history.

(56) References Cited

U.S. PATENT DOCUMENTS

| | | | |
|---|---|---|---|
| 10,326,518 B1* | 6/2019 | Magley | H04B 7/15528 |
| 2006/0235931 A1* | 10/2006 | Ruthe | H04L 51/066 |
| | | | 709/206 |
| 2018/0132177 A1* | 5/2018 | Gandhi | H04W 52/0235 |
| 2019/0334983 A1* | 10/2019 | Largman | H04L 67/1034 |

OTHER PUBLICATIONS

Mar. 15, 2019 Search Report issued in French Patent Application No. 18/55823.

* cited by examiner

DELEGATION OF MANAGEMENT OF ACKNOWLEDGEMENTS AND OF TRANSMISSION OF FRAMES

The present invention relates to a delegation of acknowledgements and of the transmission of downlink frames in a communication system.

The Internet of Things is emerging. The Internet of Things represents the extension of the internet to things and to places in the physical world. Whereas the internet does not normally extend beyond the electronic world, the Internet of Things represents exchanges of information and data coming from devices present in the real world to the internet, such as for example for making a collection of electricity-consumption or water-consumption readings. The Internet of Things is considered to be the third evolution of the internet, referred to as Web 3.0. The Internet of Things is partly responsible for the current increase in the volume of data to be transmitted and stored and thus gives rise to what is called "Big Data". The Internet of Things has a universal character for designating a putting of objects in communication for various uses, for example in the industrial, food, e-health or home-automation fields.

To enable communicating objects, also referred to as end devices, to communicate in the context of the Internet of Things, gathering gateways situated on geographically high points are deployed by an operator. Apart from maintenance operations, these gateways are typically fixed and permanent. Mention can for example be made on this model of SigFox (registered trade mark) or ThingPark (registered trade mark) networks. These gathering gateways communicate with end devices by means of medium- or long-range radio communications, such as for example the LoRaWAN (Long Range Wide-Area Network) technology, also known by the abbreviation "LoRa" (Long Range), from the name of the alliance promoting LoRaWAN technology. These gathering gateways thus serve as relays between the end devices and the server (the core network) configured to process information transferred by the end devices and to send messages (e.g. instructions) to said end devices.

In order to be able to go on standby as much as possible, the end devices, in their indirect communications with the server (via one or more gathering gateways), apply a so-called "Class A" communication mechanism in the LoRaWAN data transmission protocol. This mechanism consists of defining, deterministically for an end device in question and the gathering gateway that is acting as a relay for the server, one or more reception windows during which the end device in question listens on the communication medium (two reception windows in the case of the LoRaWAN data transmission protocol) where the downlink communications must be made. One or more reception windows begin at the end of a period of predefined duration according to a moment of transmission of an uplink frame by the end device in question and also have a predefined duration. A downlink frame that must be addressed to said end device is then performed in one or other (where applicable) of said reception windows, in particular to perform an acknowledgement of said uplink frame. It is in fact typically necessary for the end device in question to know that the server has actually received the uplink frame transmitted by said end device. This approach by reception windows beginning at deterministic moments for the end device in question and the gathering gateway that is acting as a relay for the server enables said end device to go on standby in the meantime and thus to preserve its own power supply. However, it is not certain that the round-trip time between the gathering gateways and the server will routinely make it possible to comply with these reception windows. However, the variability in latency between the gathering gateways and the server may thus lead to missing one or more reception windows, or even all the reception windows, which will require waiting until the end device in question resends an uplink frame. And, secondarily, when a plurality of reception windows are defined by the same uplink frame, it is preferable to use the first reception window in sequence, so as to enable the end device in question not to have to reawaken for any subsequent reception window that was defined according to the transmission of the same uplink frame, in order to preserve the power resources of said end device.

It is desirable to overcome these drawbacks of the prior art, which can be found more generally in wireless communication networks functioning on such reception windows (beyond radio technologies used in low power wide-area networks (LPWAN).

The invention relates to a method for managing acknowledgements and downlink transmissions in a communication system comprising a server, at least one end device and at least one gathering gateway serving as a relay between the server and said at least one end device, each end device communicating with at least one said gathering gateway via a wireless communication medium, each end device transmitting, to the server, uplink frames having moments of transmission according to which reception windows are defined, intended for downlink frames supposed to be constructed by the server and relayed on the wireless communication medium via one said gathering gateway selected by the server. A disengageable delegation mechanism vis-à-vis at least one elected end device is implemented in collaboration with the server by an elected gathering gateway performing the following steps: allocating a buffer to each elected end device and storing therein useful data received asynchronously from the server for the attention of said elected end device; and acknowledging the uplink frames received from said elected end device by constructing and transmitting in said reception windows defined according to the moments of transmission of said uplink frames, on behalf of the server, downlink frames including respective acknowledgements of said uplink frames and including, if any, useful data stored in the buffer allocated to said end device. Thus no reception window is missed because of the variability and latency between the gathering gateways and the server. In addition, a single reception window can suffice to acknowledge each uplink frame and to transmit any useful data to be addressed to the end device in question. Better reactivity of the communication system is thus achieved. In addition, the power resources of the end device are better managed. Finally, the processing load normally devolved to the server can be distributed over the gathering gateways.

According to a particular embodiment, the elected gathering gateway performs the following steps, on reception of an uplink frame: relaying the uplink frame to the server; in the case where the uplink frame is received from an elected end device, constructing the downlink frame on behalf of the server, and then transmitting the constructed downlink frame in a reception window defined according to a moment of transmission of said uplink frame; and, in the case where the uplink frame is received from a non-elected end device, keeping track that a feedback is expected from the server vis-à-vis said end device for said uplink frame. In addition, the elected gathering gateway performs the following steps, on reception of a downlink frame: in the case where the downlink frame concerns an elected end device, placing the useful data, supplied in the downlink frame by the server, in the buffer allocated to said elected end device; and, in the case where the downlink frame concerns a non-elected end device, when track has been kept of the fact that a feedback is expected from the server vis-à-vis an uplink frame received from said non-elected end device, relaying the downlink frame in one said reception window defined according to a moment of reception of said uplink frame, and discarding the downlink frame otherwise.

According to a particular embodiment, on an instruction to deactivate the delegation mechanism vis-à-vis one said elected end device, the elected gathering gateway performs the following steps: if the buffer allocated to the elected end device is empty, confirming with the server that the delegation mechanism is deactivated vis-à-vis said elected end device; if the buffer allocated to the elected end device is not empty, maintaining the delegation mechanism until said buffer is emptied by construction and transmission of said downlink frames by the elected gathering gateway.

According to a particular embodiment, on an instruction to activate the delegation mechanism vis-à-vis one said elected end device, one said gathering gateway becomes the elected gathering gateway for said elected end device and receives from the server a downlink-frame counter value. In addition, the elected gathering gateway increments the downlink-frame counter value as said downlink frames are constructed for the attention of said elected end device and includes the incremented value of the downlink-frame counter in said downlink frames. And, on an instruction to deactivate the delegation mechanism vis-à-vis said elected end device, the elected gathering gateway includes an up-to-date value of the downlink-frame counter in a message confirming with the server that the delegation mechanism is deactivated vis-à-vis said elected end device.

According to a particular embodiment, on an instruction to activate the delegation mechanism vis-à-vis said elected end device, the elected gathering gateway receives from the server information indicating which format is used for representing the value of the downlink-frame counter.

According to a particular embodiment, on an instruction to activate the delegation mechanism vis-à-vis one said elected end device, the elected gathering gateway receives from the server security keys for authenticating said elected end device in each uplink frame supposed to be received from said elected end device and for encrypting any downlink frame constructed by the elected gathering gateway for the attention of said elected end device.

According to a particular embodiment, the communication system is a low power wide-area network LPWAN.

The invention also relates to a gathering gateway, referred to as the elected gathering gateway, in the context of a management of acknowledgements and downlink transmissions in a communication system comprising a server, at least one end device and at least one gathering gateway serving as a relay between the server and said at least one end device, each end device communicating with at least one said gathering gateway via a wireless communication medium, each end device transmitting, to the server, uplink frames having moments of transmission according to which reception windows are defined, intended for downlink frames supposed to be constructed by the server and relayed on the wireless communication medium via one said gathering gateway selected by the server. The elected gathering gateway implements, in collaboration with the server, a disengageable delegation mechanism vis-à-vis at least one elected end device, wherein said elected gathering gateway comprises: means for allocating a buffer to each elected end device and storing therein useful data received asynchronously from the server for the attention of said elected end device; and means for acknowledging the uplink frames received from each elected end device by constructing and transmitting, in said reception windows defined according to the moments of transmission of said uplink frames, on behalf of the server, downlink frames including respective acknowledgements of said uplink frames and including, if any, useful data stored in the buffer allocated to said end device.

The invention also relates to a computer program, which can be stored on a medium and/or downloaded from a communication network, in order to be read by a processor. This computer program comprises instructions for implementing the method mentioned above, when said program is executed by the processor. The invention also relates to an information storage medium storing such a computer program.

The features of the invention mentioned above, as well as others, will emerge more clearly from a reading of the following description of an example embodiment, said description being given in relation to the accompanying drawings, among which:

Figure 1:
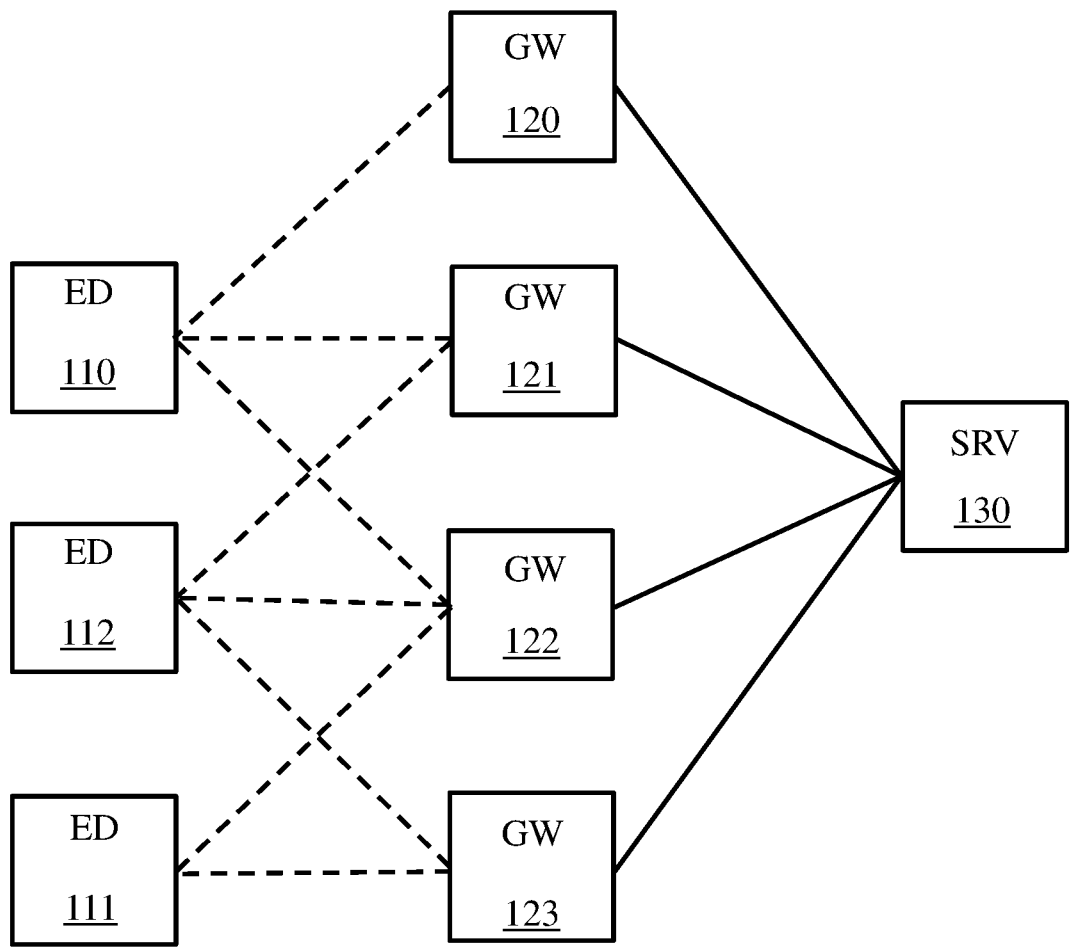
FIG. 1 illustrates schematically a communication system.

FIG. 1 illustrates schematically a communication system in which the present invention can be implemented. The communication system comprises at least one gathering gateway 120, 121, 122, 123 (denoted GW, standing for "GateWay", in the FIGS.). The gathering gateways 120, 121, 122, 123 have respective communication links with a server 130 (denoted SRV in the FIGS.) to which said gathering gateways 120, 121, 122, 123 are attached. For example, the server 130 is of the LNS (LoRaWAN network server) type. Four gathering gateways are shown in FIG. 1, but the communication system may comprise a different number of gathering gateways.

In the communication system, messages must be transferred in the form of frames from a set of end devices 110, 111, 112 (denoted ED, standing for End Device) as far as the server 130. Three end devices are shown in FIG. 1, but the communication system may comprise a different number of end devices.

The server 130 has a role of checking and gathering available information from the end devices 110, 111, 112, and the gathering gateways 120, 121, 122, 123 have a role of relay between the end devices 110, 111, 112 and the server 130. To make it possible to fulfil this role of relay, each gathering gateway 120, 121, 122, 123 has at least one radio interface enabling said gathering gateway to communicate with at least one end device 110, 111, 112 by relying on a wireless communication medium, and preferentially according to an LPWAN communication technology. Said radio interface is for example of the LoRa type thus making it possible to implement, in the communication system, a data transmission protocol of the LoRaWAN type modified as described hereinafter. Said radio interface is such that an end device can be within radio communication range of a plurality of gathering gateways, depending on the geographical position of said end device with respect to the gathering gateways 120, 121, 122, 123 and the radio transmission conditions in the environment of said end device and gathering gateways 120, 121, 122, 123. This is the case for example with the end device 110 in FIG. 1, which is within radio communication range of the gathering gateways 120, 121 and 122 (represented by broken lines in FIG. 1). In addition, each gathering gateway 120, 121, 122, 123 has at least one other interface enabling said gathering gateway to communicate with the server 130. For example, this other interface is a cabled interface making it possible to communicate with the server 130 via the internet or a GPRS (General Packet Radio Service) radio interface.

An example of protocol architecture implemented in the communication system in order thus to enable the end devices 110, 111, 112 and the server 130 to communicate via the gathering gateways 120, 121, 122, 123 is described hereinafter in relation to FIG. 3.

At least one gathering gateway 120, 121, 122, 123 of the communication system is compatible with a delegation mechanism, as detailed below, under the control of the server 130.

Figure 2:
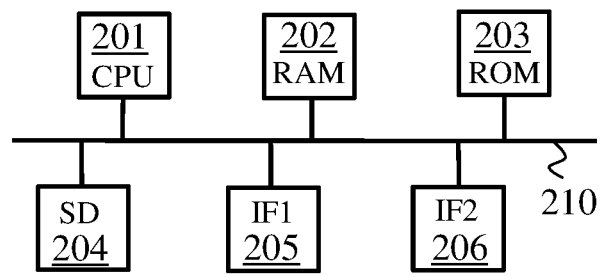
FIG. 2 illustrates schematically an example of hardware architecture of a communication device.

FIG. 2 illustrates schematically an example of hardware architecture of a communication device of the communication system in FIG. 1. Each end device 110, 111, 112 and/or each gathering gateway 120, 121, 122, 123 and/or the server 130 can be constructed on the basis of such a hardware architecture.

The communication device comprises, connected by a communication bus 210: a processor or CPU (central processing unit) 201; a random access memory RAM 202; a read only memory ROM 203; a storage unit or a storage medium reader, such as an SD (secure digital) card reader 204 or a hard disk drive HDD; a communication interface IF1 205, and optionally another communication interface IF2 206.

When the communication device in FIG. 2 represents an end device of the communication system, the communication interface IF1 205 is configured to enable said end device to communicate with gathering gateways of the communication system.

When the communication device in FIG. 2 represents a gathering gateway 120, 121, 122, 123 of the communication system, the communication interface IF1 205 is configured to enable said gathering gateway to communicate with end devices of the communication system, and the other communication interface IF2 206 is configured to enable said gathering gateway to communicate with the server 130.

When the communication device in FIG. 2 represents the server 130, the communication interface IF1 205 is configured to enable said server 130 to communicate with the gathering gateways 120, 121, 122, 123, in a way that is compatible with the communication interface IF2 206 of the gathering gateways 120, 121, 122, 123.

The processor 201 is capable of executing instructions loaded in the RAM 202 from the ROM 203, from an external memory, from a storage medium or from a communication network. When the communication device in question is powered up, the processor 201 is capable of reading instructions from the RAM 202 and executing them. These instructions form a computer program causing the implementation, by the processor 201, of all or some of the algorithms and steps described here in relation to the communication device in question.

Thus all or some of the algorithms and steps described here can be implemented in software form by the execution of a set of instructions by a programmable machine, such as a DSP (digital signal processor) or a microcontroller. All or some of the algorithms and steps described here can also be implemented in hardware form by a machine or a dedicated component, such as an FPGA (field-programmable gate array) or an ASIC (application-specific integrated circuit). In general terms, the communication device in question comprises electronic circuitry suitable and configured for implementing the algorithms and steps described here in relation to the communication device in question.

Figure 3:
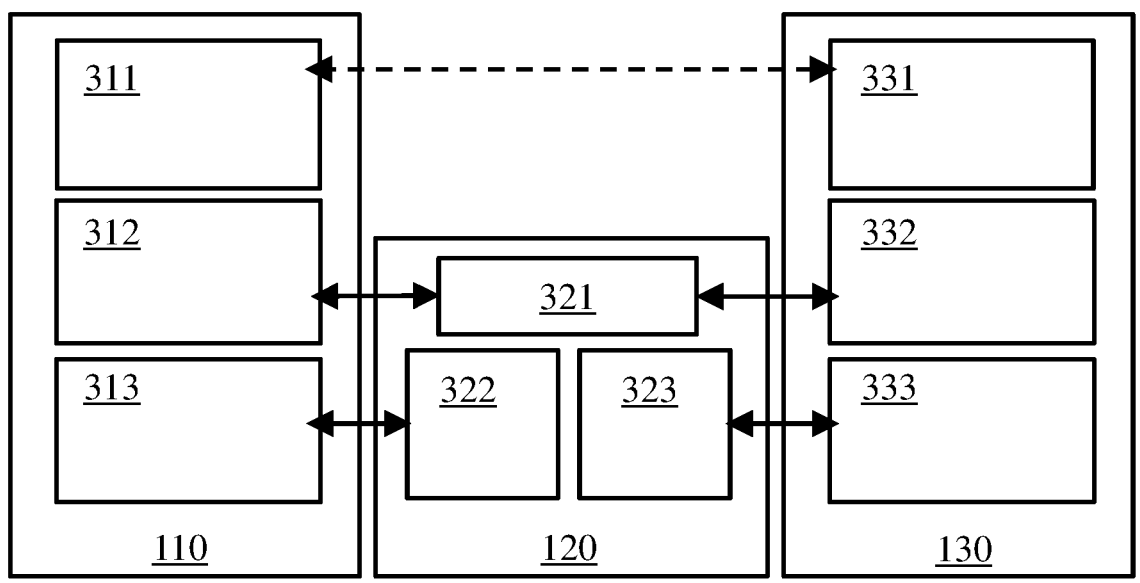
FIG. 3 illustrates schematically an example of protocol architecture.

FIG. 3 illustrates schematically an example of protocol architecture implemented in the communication system of FIG. 1. The protocol architecture is distributed between the end devices, the gathering gateways and the server 130. We shall consider by way of illustration communications between the end device 110 and the server 130 via the gathering gateway 120.

The end device 110 comprises a top layer 311 and a bottom layer 313, as well as an intermediate layer 312 forming the link between the top layer 311 and the bottom layer 313. The top layer 311 is a client application. The end device 110 may thus comprise a plurality of client applications. The intermediate layer 312 implements the exchange protocol, for example of the LoRaWAN type, between the end device 110 and the server 130. The bottom layer 313 is the physical layer (PHY) of the radio interface of the end device 110, for example of the LoRa type, which enables said end device 110 to communicate with the gathering gateways of the communication system, such as for example the gathering gateway 120.

The server 130 comprises a top layer 331 and a bottom layer 333, as well as an intermediate layer 332 forming the link between the top layer 331 and the bottom layer 333. The top layer 331 is a server application. The server 130 may thus comprise a plurality of server applications. It should be noted that the representation in FIG. 3 is a logic representation, and that the server applications may be executed on respective items of equipment distinct from the server 130.

The intermediate layer 332 implements the exchange protocol, for example of the HTTPS (Hypertext Transfer Protocol Secure) type, between the server 130 and the gathering gateways 120, 121, 122, 123. The bottom layer 333 is the physical layer (PHY) of the interface of the server 130 that makes it possible to communicate with the gathering gateways 120, 121, 122, 123.

The gathering gateway 120 comprises a first bottom layer 322 and a second bottom layer 323, as well as an adaptation module 321. The first bottom layer 322 is the physical layer (PHY) of the radio interface of the gathering gateway 120 that makes it possible to communicate with end devices of the communication system, such as for example the end device 110. The second bottom layer 323 is the physical layer (PHY) of the interface of the gathering gateway 120 that makes it possible to communicate with the server 130. The adaptation module 321 is configured to convert the frames received via the first bottom layer 322 into a format suited to the second bottom layer 323, or vice versa, so as to forward the frames from the end device 110 as far as the server 130, and vice versa. During this conversion, the gathering gateway 120 can enhance said frame with supplementary information, such as for example a received signal strength indication RSSI determined by said gathering gateway 120 on reception of the frame coming from the end device 110.

The protocol architecture depicted in FIG. 3 is such that the intermediate layer 312 of the end device 110 communicates with the intermediate layer 321 of the gateway 120, relying on the respective bottom layers of the end device 110 and of the gathering gateway 120. The protocol architecture depicted in FIG. 3 is also such that the top layer 311 of the end device 110 communicates with the top layer 331 of the server 130, relying on the respective intermediate layers 312, 321, 332 of the end device 110 and of the server 130. The same server application can thus communicate with respective client applications executed on as many end devices, and the same end device executing a plurality of client applications can thus communicate with as many server applications executed on the server 130.

The protocol layers and modules depicted may be supplemented, in particular with protocol stacks enabling the server 130 to exchange with the gathering gateway 120, in particular to enable the server 130 to configure the gathering gateway 120 vis-à-vis the delegation mechanism.

When the server 130 decides to activate the delegation mechanism with the gathering gateway 120 vis-à-vis an end device in question, some of the functions provided by the intermediate layer 332 in its communications with the end device in question are transferred under the responsibility of the adaptation module 321. The adaptation mode 321 continues to forward to the server 130 the received frames coming from the end device 110, referred to as uplink frames, and to forward to the end device 110 the received frames coming from the server 130, referred to as downlink frames. However, furthermore, the adaptation mode 321 anticipates the acknowledgement of the uplink frames on behalf of the intermediate layer 332 of the server 130. In addition, the adaptation mode 321 activates a buffer enabling the server 130 to offset as close as possible to the end device 110 the storage of downlink frames to be sent to the end device 110. This buffer is then filled asynchronously, that is to say without taking account of the transmission-reception synchronism to be complied with via the reception windows between the gathering gateways and the end devices. Thus, when an uplink frame is received from the end device 110, the gathering gateway has available data and mechanisms necessary for acknowledging the uplink frames as quickly as possible and if required to transmit to the end device 110 data that are intended for it from the server 130. This aspect is detailed hereinafter in relation to FIGS. 4 to 9.

Figure 4:
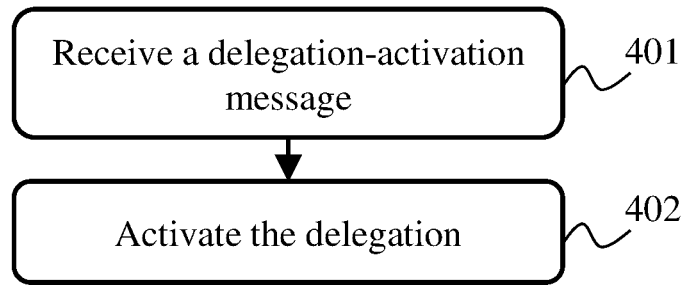
FIG. 4 illustrates schematically a delegation-mechanism activation algorithm.

FIG. 4 illustrates schematically an algorithm for activating the delegation mechanism vis-à-vis an end device. The algorithm in FIG. 4 is implemented via each gathering gateway compatible with the delegation mechanism. We shall consider by way of illustration that the algorithm in FIG. 4 is implemented by the gathering gateway 120.

In a step 401, the gathering gateway 120 receives a message START-RQ representing a request for activation of the delegation mechanism vis-à-vis an end device. An "elected gathering gateway" and "elected end device" can then be spoken of, since they were selected for establishing the delegation mechanism. The message START-RQ is addressed to the gathering gateway 120 by the server 130, in order to relieve the server 130 of certain tasks and to reduce the reaction time of the communication system when an end device transmits an uplink frame.

In a step 402, the gathering gateway 120 activates the delegation mechanism internally. The delegation mechanism concerns an end device in particular, as stated in the message START-RQ received from the server 130. The gathering gateway 120 thus keeps track of having to acknowledge, on behalf of the server 130, the uplink frames received from the end device in question.

The gathering gateway 120 further initialises a buffer delegated to the downlink transmissions required by the server 130 intended for the end device in question. This buffer is then allocated to said end device and makes it possible to make asynchronous, from the point of view of the server 130, the downlink transmissions intended for said end device with respect to the uplink transmissions coming from said end device.

In a particular embodiment, the communications between the server 130 and the end device in question are encrypted. The message START-RQ then contains any security key necessary for authenticating the end device in an uplink frame received and for making it possible to encrypt any downlink frame intended for said end device. More specifically, these are the NtwSEncKey, FNwkSIntKey and SNwkSIntKey security keys in the LoRaWAN protocol. The message START-RQ can also contain a security key enabling the gathering gateway 120 to decipher as required the uplink frames received from said end device, which makes it possible to relieve accordingly the tasks of the server 130 especially when the communications between the gathering gateways and the server 130 are themselves secured. Since these security keys are unique for each end device, the message START-RQ includes said security keys, optionally themselves in encrypted form by means of another security key previously known to the server 130 and to the gathering gateway 120.

In a particular embodiment, the exchanges between the server 130 and each end device are governed by means of counters. This is the case for example in the LoRaWAN protocol, where an uplink-frame counter is maintained by the end device in question and a downlink-frame counter is maintained, vis-à-vis said end device, by the server 130. More specifically, the downlink-frame counter, referred to as NFCntDown, indicates the number of downlink frames transmitted by the server 130 to the end device in question. When the end device receives a new downlink frame, it compares the value of the counter NFCntDown indicated in the frame with respect to the value of said counter indicated in the last downlink frame received from the server 130. If the value indicated in the new downlink frame is higher, the end device processes the new downlink frame, otherwise the end device discards the new downlink frame. Thus, by delegating the transmission of the downlink frames to the gathering gateway 120, the server 130 also delegates the management of the downlink-frame counter NFCntDown. The current value of the downlink-frame counter NFCntDown is then supplied by the server 130 in the message START-RQ.

It should be noted that the client and server applications may also maintain their own counters. This is also the case in the LoRaWAN protocol, where a downlink applicative frame counter AFCntDown is maintained. However, this downlink applicative frame counter AFCntDown is independent of the downlink frame counter NFCntDown, so as to disregard, at the application level, the communication modes actually used between the server 130 and the end device in question.

In addition, in a particular embodiment, the values of the uplink frame counter and of the downlink frame counter may, through the choice of the server 130 or through the design choice of the communication system, be represented in various formats. The server 130 may thus use a certain format with certain end devices and another format with other end devices. In this case, the message START-RQ states which format is used vis-à-vis the end device to which said START-RQ message relates. For example, a first format corresponds to a 16-bit counting and a second format corresponds to a 32-bit counting, and a bit of the message START-RQ is used to indicate whether the counting is carried out in 16 or 32 bits.

Figure 5:
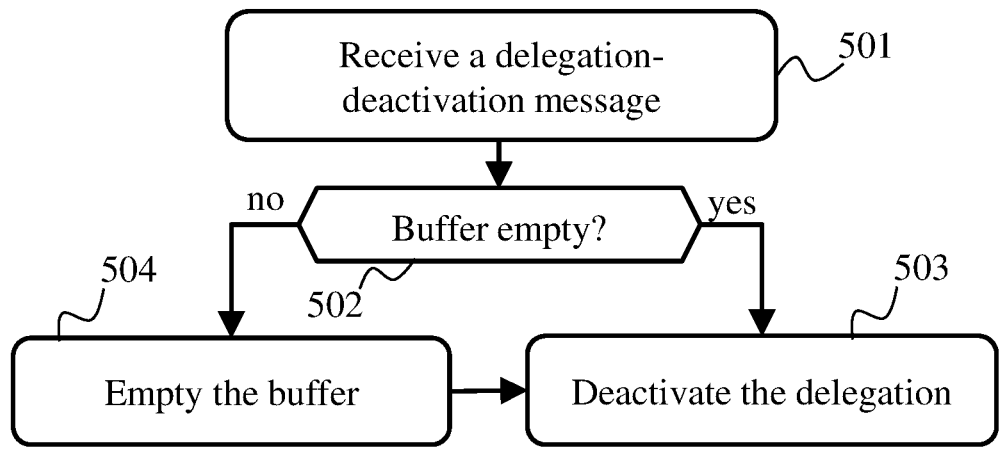
FIG. 5 illustrates schematically a delegation-mechanism deactivation algorithm.

FIG. 5 illustrates schematically an algorithm for deactivating the delegation mechanism vis-à-vis an end device. We shall consider by way of illustration that the algorithm in FIG. 5 is implemented by the gathering gateway 120.

In a step 501, the gathering gateway 120 receives a message STOP-RQ representing a request to deactivate the delegation mechanism vis-à-vis an end device for which the server 130 previously activated the delegation mechanism with said gathering gateway 120. The message STOP-RQ is addressed to the gathering gateway 120 by the server 130. According to a first example, the server 130 wishes to put an end to the delegation vis-à-vis said end device in order to transfer the delegation to another gathering gateway. This is because the delegation vis-à-vis an end device can be conferred only on a single gathering gateway, in order to avoid conflicts of uplink-frame acknowledgement. This aspect is presented hereinafter in relation to FIG. 8. According to a second example, the server 130 wishes to disengage the delegation mechanism vis-à-vis said end device since the server 130 has more processing resources available than before.

In a step 502, the gathering gateway 120 checks whether or not the buffer associated with the delegation is empty. In other words, the gathering gateway 120 checks whether useful data for the attention of the end device in question are still awaiting transmission. If the buffer is empty, the gathering gateway 120 can hand over to the server 130 and a step 504 is performed; otherwise the gathering gateway must wait until the buffer becomes empty, and a step 503 is performed.

In step 503, the gathering gateway 120 empties the buffer by transmitting, to the end device, the useful data still waiting for the end device concerned. The gathering gateway 120 must transmit said useful data in the form of downlink transmissions in reception windows that are defined according to moments of transmission of uplink frames by the end device in question, since for the rest of the time said end device is probably on standby. In other words, the gathering gateway 120 maintains the delegation method until said buffer is emptied. The transmissions of downlink frames by the gathering gateway 120 on behalf of the server 130 are moreover detailed below in relation to FIG. 7. Next, step 504 is performed.

In step 504, the gathering gateway 120 internally deactivates the delegation mechanism for the end device specified in the message STOP-RQ received from the server 130. The gathering gateway 120 then stops acknowledging, on behalf of the server 130, the uplink frames received from the end device in question. Moreover, the gathering gateway 120 releases the buffer that was allocated to the delegation for said end device.

In the particular embodiment where the communications between the server 130 and the end device in question are encrypted, the gathering gateway 120 deletes the security keys associated with said end device.

After having internally deactivated the delegation mechanism for the end device in question, the gathering gateway 120 confirms the deactivation with the server 130 by means of a message STATUS. The server 130 then knows that all the downlink frames the transmission management of which was delegated to the gathering gateway 120 vis-à-vis the end device in question have been transmitted to said end device.

In the particular embodiment where the exchanges between the server 130 and each end device are governed by means of counters, the message STATUS includes the up-to-date value of the downlink-frame counter. Thus the server 130 can take over with regard to the management of transmission of the downlink frames or hand over to another gathering gateway transparently for the (elected) end device in question.

It is therefore apparent, in the light of the above, that the delegation mechanism is disengageable.

It should be noted that, in a particular embodiment, the server 130 can, with the same message STOP-RQ, request the elected gathering gateway in question to deactivate the delegation mechanism for all the end devices for which the server 130 has entrusted to said elected gathering gateway the management of the acknowledgements and transmissions of downlink frames. In which case the algorithm in FIG. 5 is executed for each of the end devices concerned, knowing that a single message STATUS can be sent to the server 130 for all the end devices in question.

Figure 6:
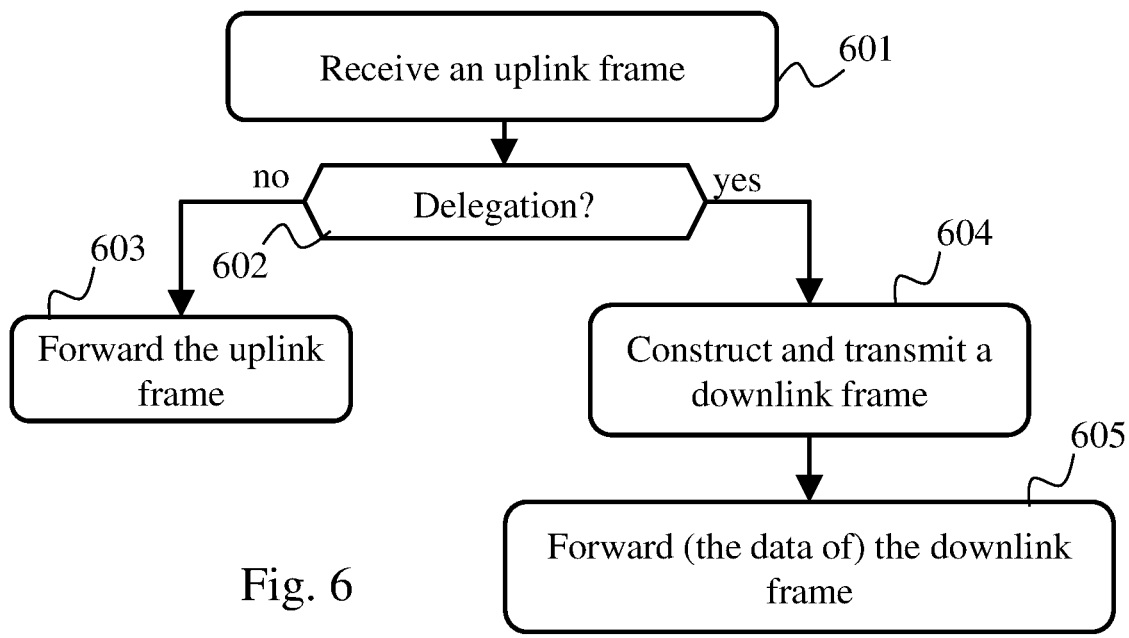
FIG. 6 illustrates schematically an uplink-frame processing algorithm.

FIG. 6 illustrates schematically an uplink-frame processing algorithm. The algorithm in FIG. 6 is implemented by each gathering gateway compatible with the delegation mechanism. We shall consider by way of illustration that the algorithm in FIG. 6 is implemented by the gathering gateway 120.

In a step 601, the gathering gateway 120 receives an uplink frame coming from an end device. The uplink frame specifies from which end device said uplink frame comes.

In a step 602, the gathering gateway 120 checks whether or not the delegation mechanism has been activated vis-à-vis said end device. If such is the case, a step 604 is performed; otherwise a step 603 is performed.

In step 603, the gathering gateway 120 forwards the uplink frame to the server 130, so that the server application concerned can process the content thereof. The gathering gateway 120 here serves simply as a relay and keeps track of the fact that a feedback is expected from the server 130 vis-à-vis said uplink frame at least in order to acknowledge said uplink frame and optionally to provide supplementary useful data.

The gathering gateway 120 keeps track of the reception of said uplink frame and of the moment at which said uplink frame was received, so as to be able subsequently to determine the reception window to use. When the server 130 subsequently sends the downlink frame to be forwarded to the end device in question in response to said uplink frame, the server 130 supplies time information representing a duration, and the gathering gateway 120 adds said duration to the moment at which said uplink frame was received in order to determine what is the start time of the reception window to be used.

In a variant, the gathering gateway 120 schedules at least one reception window for said end device, in which the gathering gateway 120 is supposed to relay a downlink frame that will subsequently be supplied by the server 130 (the case here of an end device that is not an elected end device). The gathering gateway 120 then monitors that the server 130 transmits a downlink frame to be forwarded to the end device in question in response to said uplink frame within a suitable time for complying with one said reception window thus scheduled.

In step 604, the gathering gateway 120 must acknowledge, on behalf of the server 130, the uplink frame received at step 601. The acknowledgement must take place in one said reception window defined according to a moment of transmission of said uplink frame, so as to ensure that said end device is listening out on the communication medium at that moment. The gathering gateway 120 checks whether the buffer associated with said end device contains useful data supplied by the server 130 for the attention of said end device. If the buffer does not contain such useful data, the gathering gateway 120 constructs a downlink frame including the aforementioned acknowledgement and transmits the downlink frame thus constructed to said end device. Otherwise the gathering gateway 120 constructs a downlink frame including the aforementioned acknowledgement and also including data stored in the buffer. These data are then deleted from the buffer, and the gathering gateway 120 transmits the downlink frame thus constructed to said end device, and step 604 is next performed.

In the particular embodiment where the exchanges between the server 130 and each end device are governed by means of counters, the gathering gateway 120 increments by one unit the downlink-frame counter associated with said end device, and enters in the downlink frame the incremented value of the downlink-frame counter thus obtained.

In the particular embodiment where the downlink frame must be encrypted, the gathering gateway 120 authenticates the end device by decoding an integrity code included in the uplink frame received at step 601. This integrity code is called MIC (Message Integrity Code) in the LoRaWAN protocol. If the authentication fails, the gathering gateway 120 discards the uplink frame and interrupts the execution of the algorithm in FIG. 6. In addition, the gathering gateway 120 must encrypt the downlink frame constructed, using the security keys associated with said end device, before transmitting the downlink frame in encrypted form. The downlink frame in encrypted form then includes also an integrity code authenticating the server 130, on behalf of which the gathering gateway 120 is acting.

In step 605, the gathering gateway 120 forwards to the server 130 the uplink frame or the data contained in the uplink frame, so that the server 130 can process the content thereof. The gateway can also uniquely send to the server 130 the data without delegation. Data without delegation means the data that do not concern a functionality delegated to the gathering gateway 120. The gathering gateway 120 may thus for example not propagate the integrity code contained in the uplink frame received from the end device in question. These data may be encrypted by the gathering gateway 120 by means of a security key also known to the server 130, for example using a secure tunnel.

It should be noted, in the light of the algorithm in FIG. 6, that the data contained in an uplink frame may be relayed as far as the server 130 by a plurality of gathering gateways that would capture the uplink frame in question. It is then the responsibility of the server 130 to carry out any suitable data deduplication.

Figure 7:
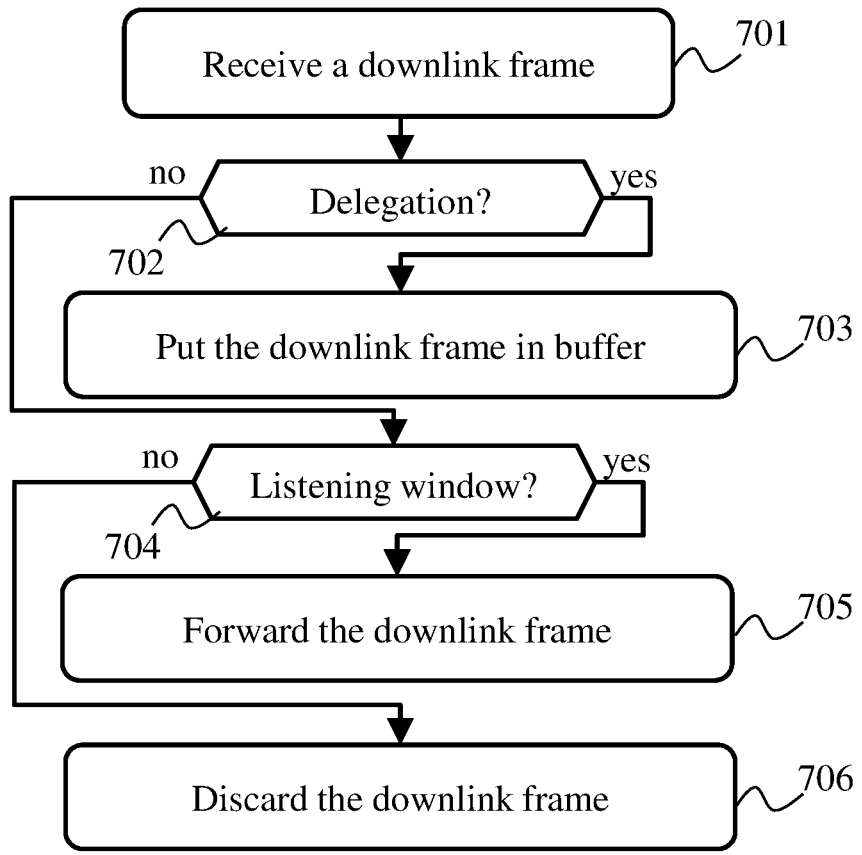
FIG. 7 illustrates schematically a downlink-frame processing algorithm.

FIG. 7 illustrates schematically a downlink-frame processing algorithm. The algorithm in FIG. 7 is implemented by each gathering gateway compatible with the delegation mechanism. We shall consider by way of illustration that the algorithm in FIG. 7 is implemented by the gathering gateway 120.

In a step 701, the gathering gateway 120 receives a downlink frame from the server 130. The downlink frame states for which end device said downlink frame is intended.

In a step 702, the gathering gateway 120 checks whether or not the delegation mechanism has been activated vis-à-vis said end device. If such is the case, a step 703 is performed; otherwise a step 704 is performed.

In step 703, the gathering gateway 120 puts the data contained in the downlink frame received at step 701 in the buffer associated with the end device for which said data are intended. "Useful data" for the attention of said end device can then be spoken of. The downlink frame received at step 701 then typically has a format other than the downlink frames transmitted by the server 130 when the delegation mechanism is not activated, since at least the acknowledgements are not managed by the server 130 when the delegation mechanism is activated. The gathering gateway 120 will subsequently send the useful data thus received from the server 130 for the attention of the end device in question, when a reception window will so permit, more particularly following a future uplink transmission by the end device in question.

In step 704, the gathering gateway 120 must provide the relaying of the downlink frame received at step 701. Given that the delegation mechanism is not activated for the end device in question, the gathering gateway 120 can perform the relaying to the end device in question only if there remains at least one reception window to come according to the uplink frame that triggered the sending of said downlink frame by the server 130. In other words, the gathering gateway 120 checks whether said gathering gateway 120 had kept track of the fact that a feedback was expected from the server 130 vis-à-vis an uplink frame previously received from said end device in question. If such is the case, a step 705 is performed; otherwise a step 706 is performed.

In step 705, the gathering gateway 120 forwards the downlink frame received at step 701 in one said reception window defined according to a moment of transmission of the uplink frame that triggered the sending of said downlink frame by the server 130.

In step 706, the gathering gateway 120 is out of time for being able to relay the downlink frame to the end device in question. The gathering gateway therefore discards the downlink frame. It is then the responsibility of the server 130 to subsequently retransmit the useful data that were contained in said downlink frame.

Figure 8:
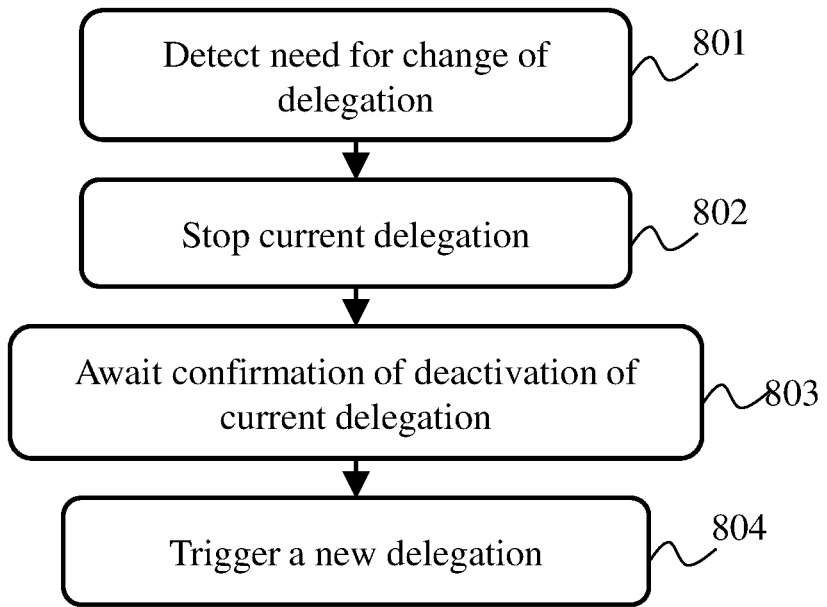
FIG. 8 illustrates schematically a delegation-change processing algorithm.

FIG. 8 illustrates schematically an algorithm for processing a change in delegation. The algorithm in FIG. 8 is implemented by the server 130.

In a step 801, the server 130 detects a need to change delegation. In other words, the server 130 decides to entrust the management of the acknowledgements and of the transmission of downlink frames, for a given end device, to another gathering gateway. For example, when the gathering gateways relay uplink frames to the server 130, said gathering gateways supply to the server 130 information on received signal strength indicator (RSSI) and/or signal to noise ratio (SNR), and the server 130 has detected that the gathering gateway to which the management of acknowledgements and transmission of downlink frames was entrusted is supplying information on reception performance below a predefined threshold whereas said other gathering gateway is supplying information on reception performance above said predefined threshold.

In a step 802, the server 130 stops the current delegation. To do this, the server 130 sends a message STOP-RQ concerning said end device to the gathering gateway that the server 130 had previously requested to activate the delegation mechanism.

In a step 803, the server 130 awaits confirmation, by means of a message STATUS, that said gathering gateway has deactivated the delegation mechanism for said end device. On reception of the message STATUS, the server 130 deduces that said gathering gateway has transmitted any useful data, for the attention of said end device, which was waiting in buffer in said gathering gateway.

In a step 804, the server 130 triggers the delegation with said other gathering gateway. To do this, the server 130 sends a message START-RQ concerning said end device to said other gathering gateway. Any new data for the attention of said end device is then sent by the server 130 to said other gathering gateway for storage in the buffer, the management of the acknowledgements and of the downlink-frame transmission thus being entrusted to said other gathering gateway.

Figure 9:
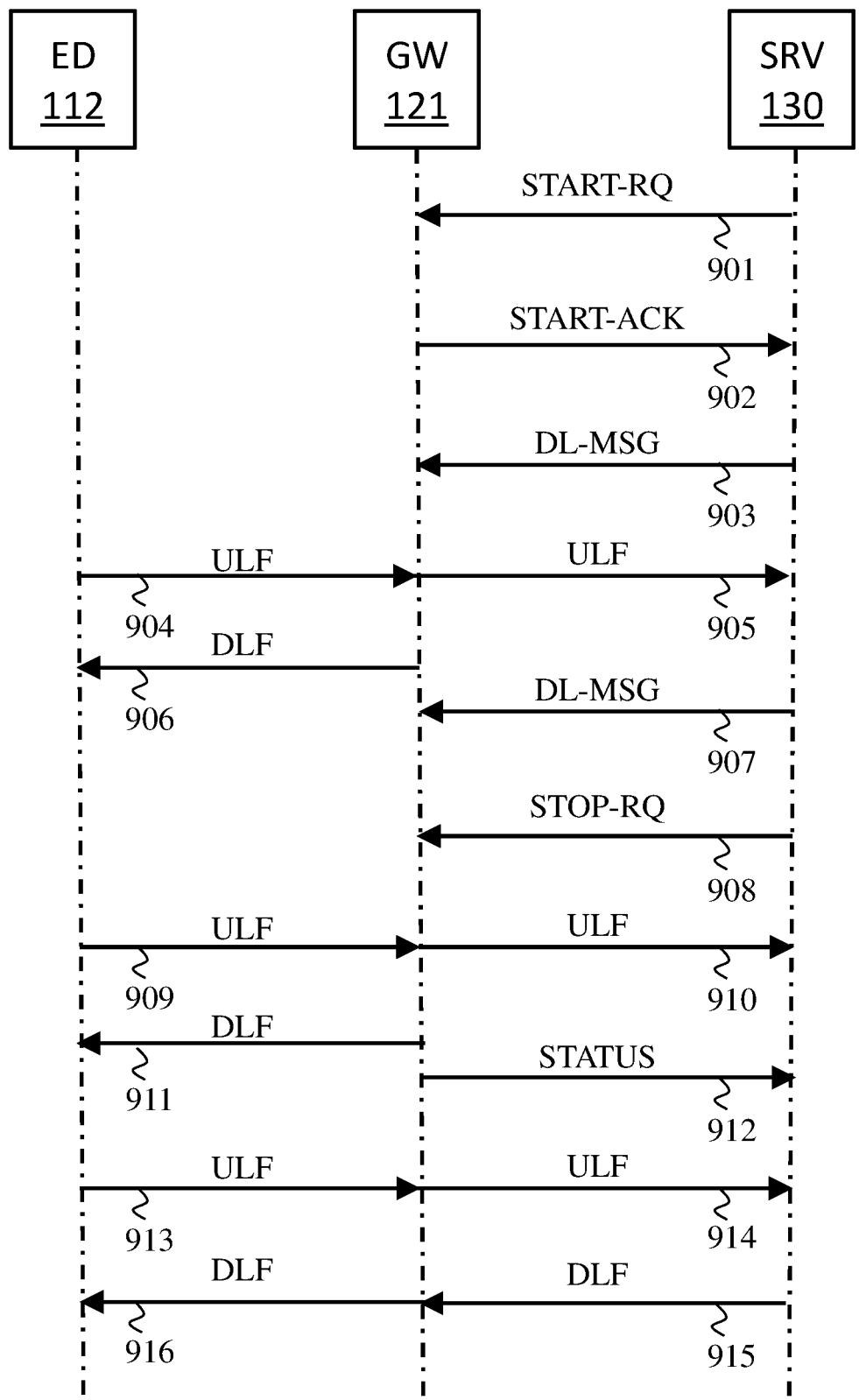
FIG. 9 illustrates schematically exchanges for the purpose of establishing the delegation mechanism, in a particular embodiment.

FIG. 9 illustrates schematically exchanges for the purpose of establishment of delegation, in a particular embodiment of the invention. By way of illustration, the exchanges are described between the server 130, the gathering gateway 121 and the end device 112.

In a step 901, the server 130 transmits to the gathering gateway 121 a message START-RQ concerning the end device 112. The server 130 thus orders the gathering gateway 121 to activate the delegation mechanism, in order to delegate to the gathering gateway 121 the management of the acknowledgements and of the transmission of the downlink frames vis-à-vis the end device 112.

In an optional step 902, the gathering gateway 121 activates the delegation mechanism for the end device 112, and transmits to the server 130 a message START-ACK acknowledging the message START-RQ, thus signifying to the server 130 that the delegation has been accepted and established.

In a step 903, the server 130 transmits to the gathering gateway 121 a message DL-MSG including useful data for the attention of the end device 112. The useful data in question are then stored by the gathering gateway 121 in the buffer allocated to the end device 112, awaiting the occurrence of a reception window for the end device 112 following an uplink-frame transmission by the end device 112.

In a step 904, the end device 112 transmits an uplink frame ULF captured by the gathering gateway 121.

In a step 905, the gathering gateway 121 forwards the uplink frame ULF to the server 130, in application of the algorithm in FIG. 6.

In a step 906, the gathering gateway 121 constructs a downlink frame DLF acknowledging the uplink frame ULF received and including the useful data put in the buffer following the reception of the message DL-MSG transmitted at step 903. The transmission of the downlink frame DLF is carried out in a reception window defined according to a moment of transmission of the uplink frame ULF of step 905. The delegation thus makes it possible in particular to avoid the server 130 being out of time for acknowledging the uplink frame ULF in question.

In a step 907, the server 130 transmits to the gathering gateway 121 a new message DL-MSG including useful data for the attention of the end device 112. The useful data in question are then stored by the gathering gateway 121 in the buffer allocated to the end device 112, awaiting the occurrence of a new reception window for the end device 112 following a transmission of a new uplink frame by the end device 112.

The exchanges between the server 130 and the end device 112 can thus continue as described in relation to steps 903 to 906 until the server 130 orders the deactivation of the delegation mechanism vis-à-vis the end device 112.

In a step 908, the server 130 transmits to the gathering gateway 121 a message STOP-RQ ordering deactivation of the delegation mechanism vis-à-vis the end device 112. The gathering gateway 121 detects that the buffer associated with the end device 112 is not yet empty.

In a step 909, the end device 112 transmits a new uplink frame ULF, captured by the gathering gateway 121.

In a step 910, the gathering gateway 121 forwards said new uplink frame ULF to the server 130, in application of the algorithm in FIG. 6.

In a step 911, the gathering gateway 121 constructs a new downlink frame DLF acknowledging said new uplink frame ULF received and including the useful data put in buffer following the reception of the message DL-MSG transmitted at step 907. The transmission of said new downlink frame DLF is carried out in a reception window defined according to a moment of transmission of said new uplink frame ULF at step 909. If the useful data remaining in buffer are too numerous to be transmitted in one go to the end device 112, the gathering gateway 121 awaits receiving again at least one new uplink frame coming from the end device 112 in order to reiterate step 911.

In a step 912, the gathering gateway 121 detects that the buffer associated with the end device 112 is empty, and transmits to the server 130 a message STATUS confirming the deactivation of the delegation mechanism for the end device 112.

The exchanges between the server 130 and the end device 112 then resume using the gathering gateway 121 (or another gathering gateway) as a simple relay, the management of the acknowledgements and of the transmission of downlink frames then being resumed by the server 130. Even if a new delegation has been made with another gathering gateway for the end device 112, the gathering gateway 121 continues to forward the uplink frames coming from the end device 112, it being the responsibility of the server 130 to manage any deduplication of data.

Thus, in a step 913, the end device 112 transmits an uplink frame ULF, captured by the gathering gateway 121.

In a step 914, the gathering gateway 121 forwards the uplink frame ULF to the server 130, in application of the algorithm in FIG. 6. The gathering gateway 121 schedules at least one reception window defined according to the moment of transmission of the uplink frame ULF of step 913.

In a step 915, the server 130 transmits to the gathering gateway 121 (since the server 130 has chosen the gathering gateway 121 as a relay for propagating the acknowledgement and optionally other data to the end device 112 in response to the uplink frame of step 913) a downlink frame DLF for the attention of the end device 112.

In a step 916, the gathering gateway 121 relays the downlink frame DLF intended for the end device 112. The transmission of this downlink frame DLF is carried out in a previously programmed reception window. The round-trip time between the gathering gateway 121 and the server 130, added to the time for processing by the server 130, must be sufficiently short to enable the gathering gateway 121 to be ready to relay said downlink frame DLF before said scheduled reception window occurs. In the contrary case, the downlink frame ULF is discarded by the gathering gateway 121, and new exchanges between the end device 112 and the server 130 must be established in order to attempt to transmit the useful data and acknowledgements concerned.

The invention claimed is:

1. A method for managing acknowledgements and downlink transmissions in a communication system comprising a server, at least one end device and at least one gathering gateway serving as a relay between the server and said at least one end device, each end device communicating with at least one said gathering gateway via a wireless communication medium, each end device transmitting, to the server, uplink frames having moments of transmission according to which reception windows are defined, intended for downlink frames supposed to be constructed by the server and relayed on the wireless communication medium via one said gathering gateway selected by the server, wherein a disengageable delegation mechanism vis-à-vis at least one elected end device is implemented in collaboration with the server by an elected gathering gateway performing the method, the method comprising:

allocating a buffer, in the elected gathering gateway, to each elected end device and storing therein useful data received asynchronously from the server for the attention of said elected end device; and acknowledging the uplink frames received from said elected end device by constructing and transmitting in said reception windows defined according to the moments of transmission of said uplink frames, by the elected gathering gateway on behalf of the server, downlink frames including respective acknowledgements of said uplink frames and including useful data stored, if any, in the buffer allocated to said end device.

2. The method according to claim 1, wherein the elected gathering gateway performs, on reception of an uplink frame:

relaying the uplink frame to the server;

in the case where the uplink frame is received from an elected end device, constructing one said downlink frame on behalf of the server, and then transmitting the constructed downlink frame in a reception window defined according to a moment of transmission of said uplink frame; and in the case where the uplink frame is received from a non-elected end device, keeping track that a feedback is expected from the server vis-à-vis said end device for said uplink frame;

and performs, on reception of a downlink frame:

in the case where the downlink frame concerns an elected end device, placing the useful data, supplied in the downlink frame by the server, in the buffer allocated to said elected end device; and, in the case where the downlink frame concerns a non-elected end device, when track has been kept of the fact that a feedback is expected from the server vis-à-vis an uplink frame received from said non-elected end device, relaying the downlink frame in one said reception window defined according to a moment of reception of said uplink frame, and discarding the downlink frame otherwise.

3. The method according to claim 1, wherein, on instruction to deactivate the delegation mechanism vis-à-vis one said elected end device, the elected gathering gateway performs:

if the buffer allocated to the elected end device is empty, confirming to the server that the delegation mechanism is deactivated vis-à-vis said elected end device;

if the buffer allocated to the elected end device is not empty, maintaining the delegation mechanism until said buffer is emptied by construction and transmission of said downlink frames by the elected gathering gateway.

4. The method according to claim 3, wherein:

on instruction to activate the delegation mechanism vis-à-vis one said elected end device, one said gathering gateway becomes the elected gathering gateway for said elected end device and receives from the server a downlink-frame counter value, the elected gathering gateway increments the downlink-frame counter value as said downlink frames are constructed for the attention of said elected end device and includes the incremented value of the downlink-frame counter in said downlink frames, and on instruction to deactivate the delegation mechanism vis-à-vis said elected end device, the elected gathering gateway includes an up-to-date value of the downlink-frame counter in a message confirming to the server that the delegation mechanism is deactivated vis-à-vis said elected end device.

5. The method according to claim 4, wherein, on instruction to activate the delegation mechanism vis-à-vis said elected end device, the elected gathering gateway receives from the server information indicating which format is used for representing the value of the downlink-frame counter.

6. The method according to claim 1, wherein, on instruction to activate the delegation mechanism vis-à-vis one said elected end device, the elected gathering gateway receives from the server security keys for authenticating said elected end device in each uplink frame supposed to be received from said elected end device and for encrypting any downlink frame constructed by the elected gathering gateway for the attention of said elected end device.

7. The method according to claim 1, wherein the communication system is a low power wide-area network LPWAN.

8. Non-transitory information storage medium storing a computer program comprising a set of instructions causing execution, by a processor of a gathering gateway of a communication system, the method according to claim 1, when said computer program is executed by said processor.

9. A gathering gateway, referred to as elected gathering gateway, in the context of a management of acknowledgements and downlink transmissions in a communication system comprising a server, at least one end device and at least one gathering gateway serving as a relay between the server and said at least one end device, each end device communicating with at least one said gathering gateway via a wireless communication medium, each end device transmitting, to the server, uplink frames having moments of transmission according to which reception windows are defined, intended for downlink frames supposed to be constructed by the server and relayed on the wireless communication medium via one said gathering gateway selected by the server, wherein said elected gathering gateway implements, in collaboration with the server, a disengageable delegation mechanism vis-à-vis at least one elected end device, wherein said elected gathering gateway comprises electronics circuitry configured for:

allocating a buffer, in the elected gathering gateway, to each elected end device and storing therein useful data received asynchronously from the server for the attention of said elected end device; and acknowledging the uplink frames received from each elected end device by constructing and transmitting, in said reception windows defined according to the moments of transmission of said uplink frames, by the elected gathering gateway, on behalf of the server, downlink frames including respective acknowledgements of said uplink frames and including, if any, useful data stored in the buffer allocated to said end device.

* * * * *